(12) United States Patent
Hegde et al.

(10) Patent No.: US 8,532,794 B2
(45) Date of Patent: Sep. 10, 2013

(54) SYSTEM FOR SCHEDULING USING AN EXTERNAL CALENDARING SERVICE

(75) Inventors: Kiran Hegde, Redmond, WA (US); Cuong Huynh, Renton, WA (US); Patrick Brisbine, Sammamish, WA (US); Stuart Donaldson, Bothell, WA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 13/475,775

(22) Filed: May 18, 2012

(65) Prior Publication Data

US 2012/0232678 A1    Sep. 13, 2012

Related U.S. Application Data

(63) Continuation of application No. 12/506,990, filed on Jul. 21, 2009, now Pat. No. 8,195,309.

(51) Int. Cl.
  *G05B 11/01* (2006.01)
  *G05B 15/00* (2006.01)
  *G06F 3/00* (2006.01)
  *G06Q 10/00* (2012.01)

(52) U.S. Cl.
  USPC ............... 700/17; 700/83; 715/700; 705/7.24

(58) Field of Classification Search
  USPC ............... 700/17, 83; 715/700; 705/7.24
  See application file for complete search history.

(56) References Cited

U.S. PATENT DOCUMENTS

| | | | |
|---|---|---|---|
| 5,442,730 A | 8/1995 | Bigus | |
| 6,250,382 B1 * | 6/2001 | Rayburn et al. | 165/248 |
| 6,488,081 B2 * | 12/2002 | Rayburn et al. | 165/250 |
| 6,491,094 B2 * | 12/2002 | Rayburn et al. | 165/250 |
| 6,526,462 B1 * | 2/2003 | Elabd | 710/242 |
| 6,578,005 B1 | 6/2003 | Lesaint et al. | |
| 6,640,162 B1 * | 10/2003 | Swanson | 700/275 |
| 6,856,605 B1 * | 2/2005 | Larghi et al. | 370/313 |
| 7,124,087 B1 * | 10/2006 | Rodriguez et al. | 705/5 |
| 7,734,572 B2 * | 6/2010 | Wiemeyer et al. | 700/19 |
| 8,027,742 B2 * | 9/2011 | Seem et al. | 700/38 |
| 8,050,801 B2 * | 11/2011 | Richards et al. | 700/276 |
| 8,195,309 B2 | 6/2012 | Hegde et al. | |
| 8,219,249 B2 * | 7/2012 | Harrod et al. | 700/276 |
| 8,239,168 B2 * | 8/2012 | House et al. | 702/185 |

(Continued)

FOREIGN PATENT DOCUMENTS

WO    2005013231    2/2005

OTHER PUBLICATIONS http://www.exefind.com/cybermatrix-meeting-manager, "CyberMatrix Meeting Manager Web," 1 page, printed Dec. 2, 2008.

(Continued)

*Primary Examiner* — Ronald Hartman, Jr.
(74) *Attorney, Agent, or Firm* — Seager Tufte & Wickhem LLC

(57) ABSTRACT

A building control system incorporating an external calendar service, having a schedule subsystem, a schedule synchronization subsystem connected to the schedule subsystem, and an external calendar configuration subsystem connected to the schedule synchronization subsystem. The schedule subsystem may have a schedule object, a building schedule mechanism for activating different subsystems in a building based on a configuration of a building schedule, and a schedule change mechanism for creating, configuring and/or changing the building schedule.

20 Claims, 4 Drawing Sheets

(56) References Cited

U.S. PATENT DOCUMENTS

| | | | |
|---|---|---|---|
| 8,326,464 B2 * | 12/2012 | Clanin | 700/276 |
| 2001/0010265 A1 * | 8/2001 | Rayburn et al. | 165/257 |
| 2001/0010266 A1 * | 8/2001 | Rayburn et al. | 165/257 |
| 2001/0030609 A1 * | 10/2001 | Sen et al. | 340/679 |
| 2003/0009771 A1 * | 1/2003 | Chang | 725/135 |
| 2003/0181158 A1 * | 9/2003 | Schell et al. | 454/229 |
| 2004/0117046 A1 | 6/2004 | Colle et al. | |
| 2005/0090915 A1 * | 4/2005 | Geiwitz | 700/90 |
| 2007/0038563 A1 * | 2/2007 | Ryzerski | 705/40 |
| 2007/0106548 A1 * | 5/2007 | Bratt | 705/9 |
| 2009/0083583 A1 * | 3/2009 | Seem et al. | 714/39 |
| 2009/0307573 A1 * | 12/2009 | Lavelle et al. | 715/205 |
| 2010/0269049 A1 * | 10/2010 | Fearon | 715/744 |
| 2010/0324962 A1 * | 12/2010 | Nesler et al. | 705/8 |
| 2011/0106278 A1 * | 5/2011 | Martin-Cocher et al. | 700/90 |

OTHER PUBLICATIONS

Honeywell, "Excel Building Supervisor-Integrated R7044 and FS90 Ver. 2.0," Operator Manual, 70 pages, Apr. 1995.

Trane, "System Programming, Tracer Summit Version 14, BMTW-SVP01D-EN," 623 pages, 2002.

* cited by examiner

SYSTEM FOR SCHEDULING USING AN EXTERNAL CALENDARING SERVICE

This application is a continuation application of U.S. patent application Ser. No. 12/506,990, filed Jul. 21, 2009, and entitled "System for Scheduling Using an External Calendaring Service". U.S. patent application Ser. No. 12/506,990, filed Jul. 21, 2009, is hereby incorporated by reference.

BACKGROUND

The invention pertains to scheduling and particularly to scheduling systems.

SUMMARY

The invention is a system for building event scheduling using an external calendaring service.

DESCRIPTION

In every building automation system there are devices that are responsible for scheduled events that occur in a control system. A schedule object, for example, is responsible for managing events and activity in the system. In a building control system the schedule object is responsible for executing commands at specific times or when specific conditions are encountered.

The user interface (UI) and business logic for configuring such events is implemented as part of the Building Automation Systems (BAS) supervisor. The supervisor may be a device on the network, or it may be software installed on a stand-alone PC. The supervisor contains logic allowing the schedule object(s) to be modified. This limits interaction and configuration of the BAS to the supervisor software.

This invention enables configuration of schedule objects through an external calendar system, such as Google Calendar, and allows for bidirectional synchronization of schedule objects with the external calendar system.

This system decouples the user interface for configuring schedule objects, therefore removing the need for each supervisor to implement the UI framework. The system also provides a consistent way to manage the schedule objects since Google Calendar or Yahoo! Calendar is accessible from anywhere there is an Internet connection.

The supervisor may have a component that knows how to interact with the Google and Yahoo! Calendar services. This component would be able to use standard Internet protocols to read and write data between the external calendar system and the BAS. The component may consume the data via an RSS feed, public application programming interfaces, or any other available method. The external calendar system may act as a tool used to configure one or more schedule objects in the BAS. Schedule identifiers, which correspond to different schedule objects, would appear in each calendar event to uniquely identify the corresponding schedule object in the BAS.

The present design may be regarded as BAS schedule synchronization with an external calendar system. The design may extend a supervisor's scheduling system to be synchronized with various external calendaring systems. The design may effectively enable a schedule object to be viewed and updated by those external calendaring systems such as Google Calendar, Yahoo! Calendar, and desktop calendaring tools such as Outlook.

Figure 1:
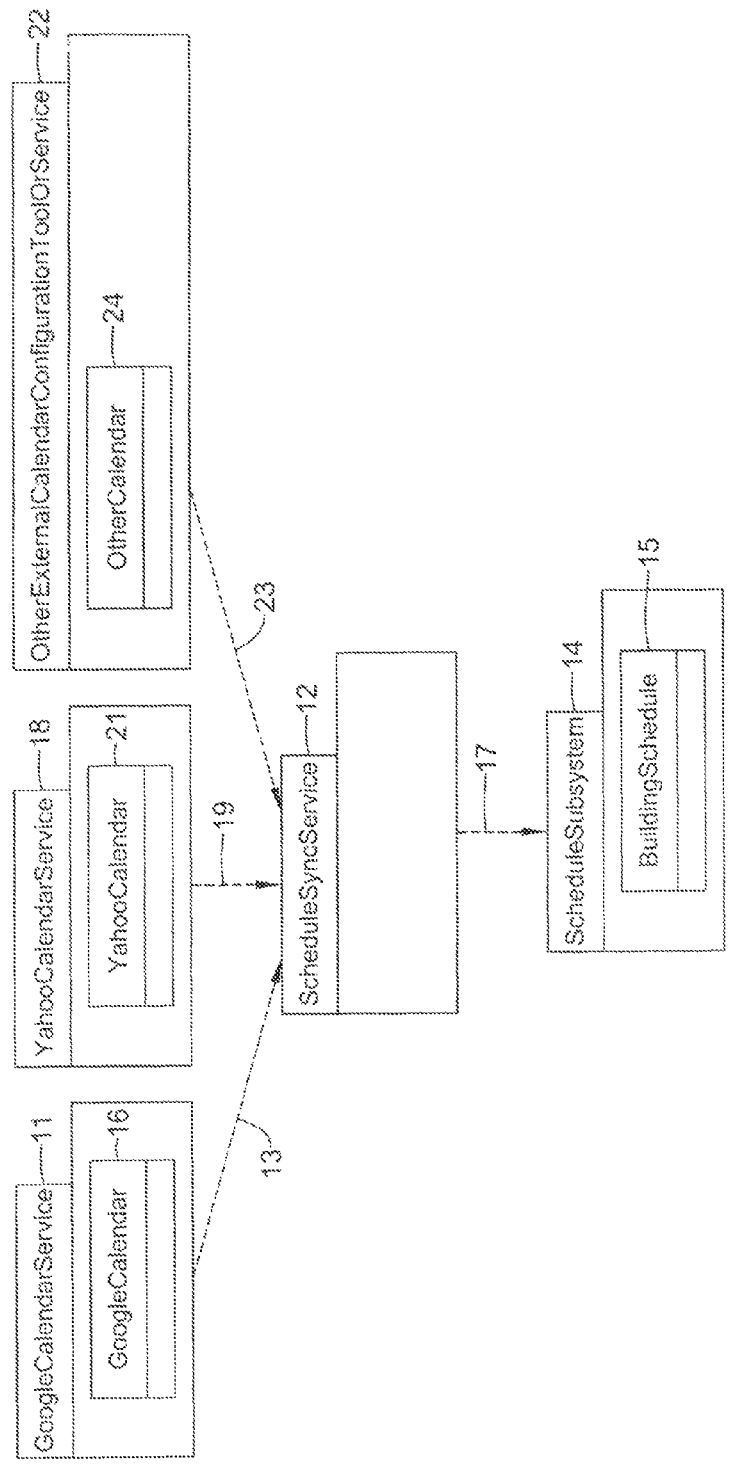
FIG. 1 is a diagram of subsystems of the present system and their relationships.

FIG. 1 is a diagram that shows relationships among schedule sync subsystems and services. An arrow-line may indicate a dependency, e.g., GoogleCalendarService 11 may depend on ScheduleSyncService 12 via arrow-line 13. Some of the subsystems may contain key classes that correspond to the schedules/calendars participating in the synchronization process as described herein, e.g., ScheduleSubsystem 14 may contain BuildingSchedule 15. GoogleCalendarService 11 may contain a GoogleCalendar 16. ScheduleSyncService 12 may depend on ScheduleSubsystem 14 via arrow-line 17. YahooCalendarService 18 may depend on ScheduleSyncService 12 via an arrow-line 19. YahooCalendarService 18 may contain a YahooCalendar 21. One or more other external calendar configuration tools or services 22 may depend on ScheduleSyncService 12 via an arrow-line 23. Tool or service 22 may contain a Calendar 24.

A brief description of each of these subsystems may be indicated herein. ScheduleSubsystem 14 may represent a building supervisor device's scheduling subsystem. Its key functionality/service may include a persistent building schedule data model (e.g., BuildingSchedule 15), and functionality for creating, reading, writing, and deleting the building schedule. ScheduleSyncService 12 may be a general building schedule control synchronization service. ScheduleSyncService 12 may be for coordinating the overall schedule synchronization process, which includes reading, detecting changes, and updating the schedule in the different systems and providing the general cross-reference configuration of building control schedule and associated external schedule info, which could include various items.

Some of the various items may include the list of mapped schedules in a configured external calendaring service, user authorized access info for reading/writing the associated schedules or calendars in the external calendaring service, and optional tags for matching a list of events in a single external calendar with each of the multiple building schedules. Additional details related to this many-to-1 relationship mapping are noted herein. Another item may include optional tags for matching schedule event requests corresponding to Add/Delete (or Reserve/Cancel) in order to support the sync method by merging. For example, each schedule edited by an external calendaring service could flag the event created with tag=Reserve <event description> to indicate that the event is to be added/merged, and tag=Cancel <event descript> to indicate the event to be deleted. (Additional options related to merging method may be defined in details at a later time as there could be different results such as whether a time block event's Add request is allowed if it's overlapped with an existing one, and so forth.)

GoogleCalendarService 11 may refer to Google Calendar's data access service. A key responsibility/functionality may include providing conversion functionality for normalizing Google Calendar service's data model (e.g., GoogleCalendar 16) into the specific building control's schedule data model (e.g., BuildingSchedule 15). It could also include providing data access functionality for creating, reading, writing, and deleting a specific configured calendar in Google's Calendaring service. This data access service may work with the normalized building control's schedule data model.

Figure 2:
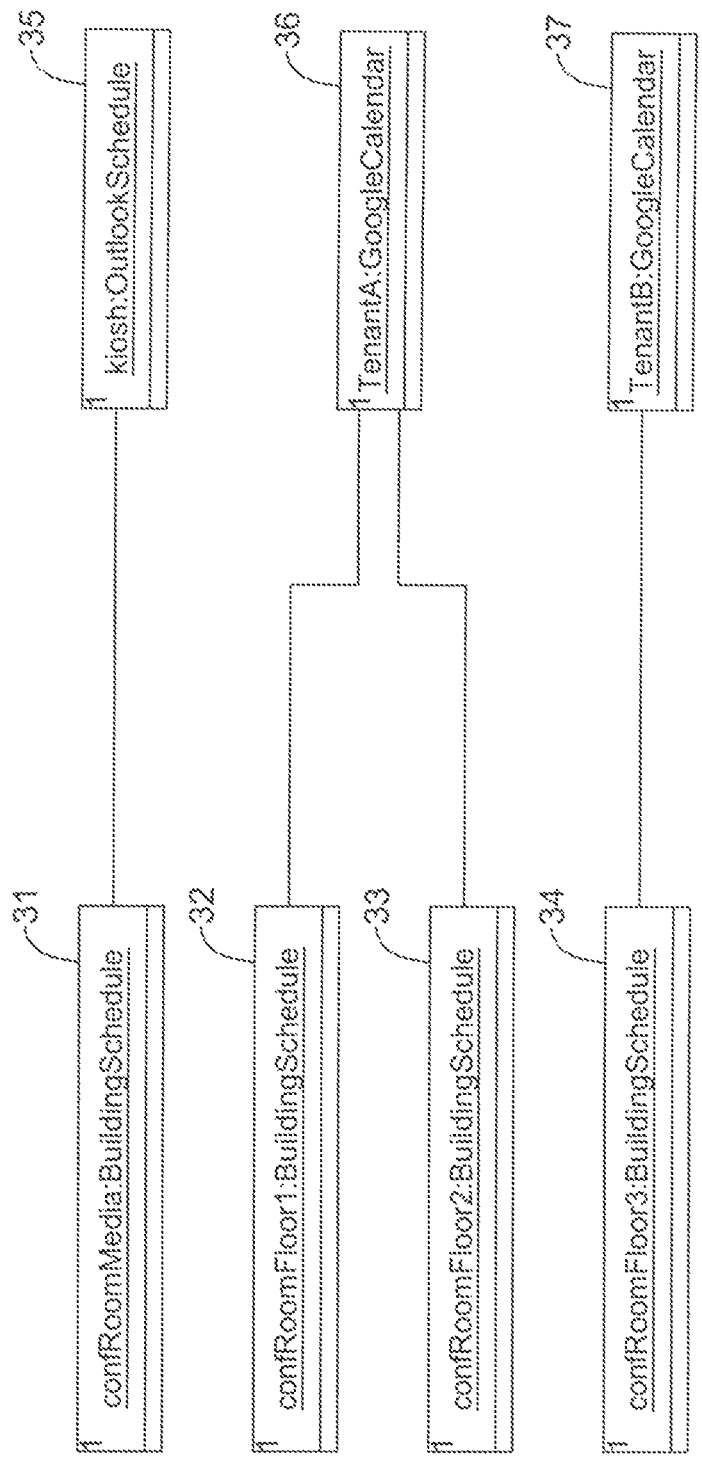
FIG. 2 is a diagram of several mapping schemes of building schedules into external schedules from several calendaring services.

An object's relationship of building schedules and external systems' calendars/schedules may be noted. FIG. 2 is an object diagram of a sample set of four building schedules 31, 32, 33 and 34, and the mapping of those into three external schedules 35, 36 and 37 from two different calendaring services. There may be various mapping configurations. For instance, 1-to-1 mapping may mean that a building control schedule 31 maps just to one external schedule 35 (as shown in building control confRoomMedia). For another configuration, many-to-1 mapping may mean that multiple building schedules 32 and 33 map to one external schedule 36 (as shown in TenantA's Google calendar). In order to differentiate which list of event time blocks in the external calendar service is associated with each of the many building schedules, this schedule synchronization method may require that each of those calendar's events be tagged with the a keyword in some fields within the external calendar/schedule data model that is recognized by the corresponding configured calendar service such as GoogleCalendarService 11. Also, there may be a configuration of 1-to-many mapping where a building schedule maps to multiple calendars/schedules in possibly multiple external calendaring services. This scenario may be used in the case of scheduling a share resource by multiple tenants or users that cannot share a single external calendaring service.

There may be subsystems/components interactions involving a sync process. The following item shows pseudo code/logic describing the process of synchronizing schedules in each of the 3 different mapping scenarios described herein. In an actual implementation, this could be combined and structurally different for optimization purposes.

One may note that the synchronization process could be a triggered by one of the following conditions. Such conditions may include being triggered periodically by the ScheduleSyncService 12 itself. A triggering may be based on schedule changes occurred in the building control system, or based on change notification from a configured external calendaring service (e.g., via exchanges for an external calendaring service for Outlook, or via Google Calendar Service's notification possibly via email, or other external calendaring service when it is available in the future.

Schedule mapping of 1-to-1 may involve a scenario of 1 building schedule/1 external schedule. The following pseudo code may outline the logic for carrying out a schedule synchronization process related to the 1-to-1 schedule mapping.

```
Get list of external schedule ( c )
For each schedule ( c )
    s = Get the corresponding building schedule
    Sync s & c *
```

Figure 3:
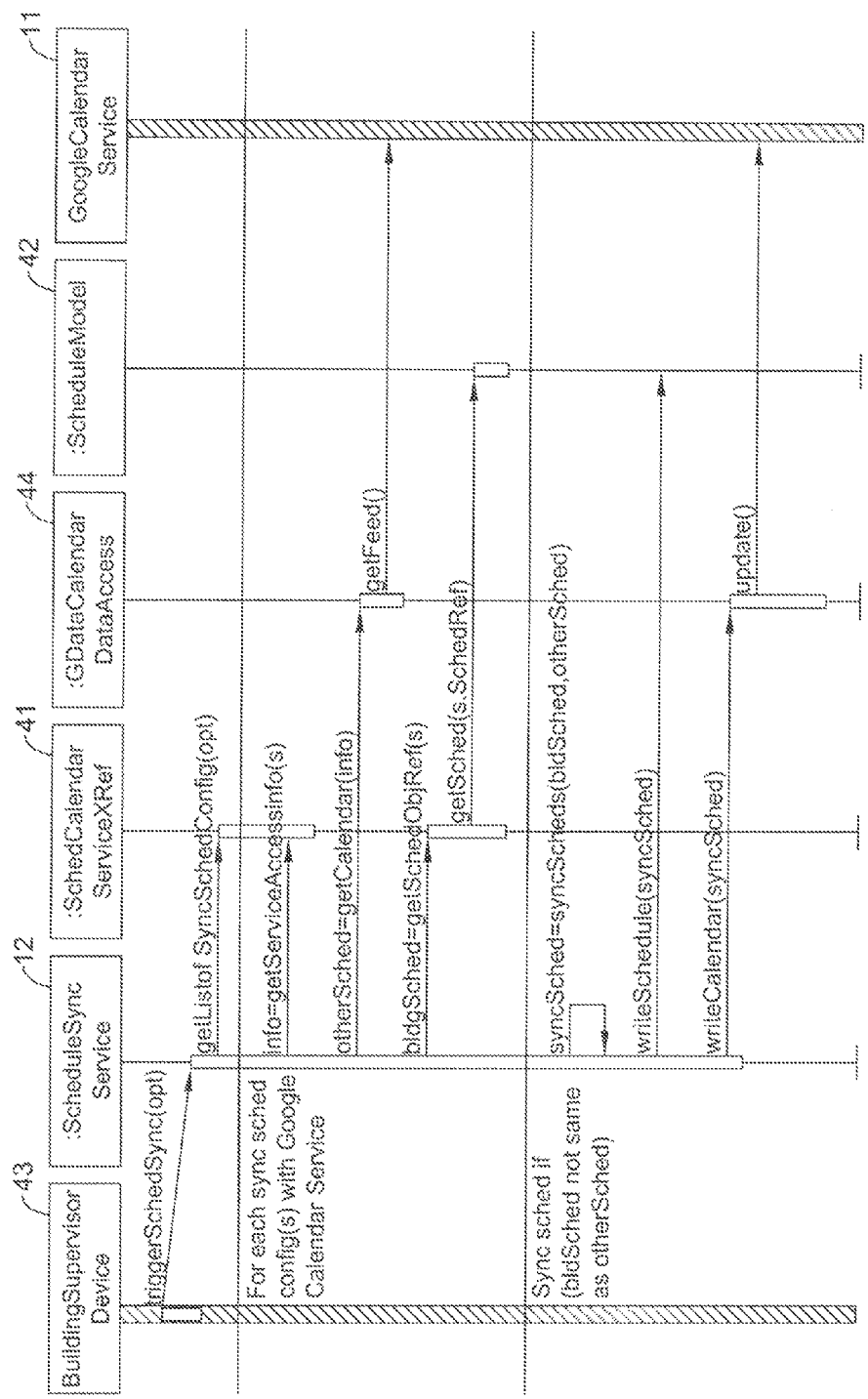
FIG. 3 is an interaction diagram illustrating subsystems in FIG. 1 in carrying out a synchronization process of a building schedule with an external calendaring system.

FIG. 3 is a sequence diagram that illustrates the synchronization process of the 1-to-1 schedule mapping in some detail. In this process, a BuildingSupervisorDevice 43 synchronizes its schedule(s) with those in an external scheduling system, e.g. GoogleCalendarService 11. The BuildingSupervisorDevice 43 calls the ScheduleSyncService's 12 triggerSchedSync(opt). The ScheduleSyncService 12 then coordinates the process of synchronizing the building schedule with the external schedule and updating each as needed.

The ScheduleSyncService 12 gets a list of schedule configurations to synchronize by calling SchedCalendarService-XRef's 41 getListofSyncSchedConfig(opt) method. Each schedule configuration item contains the following: a) information for identifying the external service's calendar and b) a reference to the associated building control schedule. A parameter "opt" may be sent to the SchedCalendarService-XRef 41 containing information associated with a specific triggering condition. The information in the "opt" parameter could be used limit the external schedule configurations that need to be synchronized. For example, the "opt" parameter could pass in the info indicating a specific schedule change occurred in the building control system. Using that info, only the impacted list of external calendaring services' schedules would need to be retrieved and synchronized. Similarly, it could pass in the info indicating specific schedule change occurred in the external calendaring service.

For each external schedule returned by the SchedCalendarServiceXRef 41, the ScheduleSyncService 12 would call the SchedCalendarServiceXRef's 41 getServiceAcessInfo(s), which would call the GDataCalendarDataAccess's 44 getCalendar(info) process, which would in turn call the GoogleCalendarService's 11 getFeed( )API to return the normalized schedule object from the external calendar service. The ScheduleSyncService 12 then calls the SchedCalendarServiceXRef's 41 getSchedObjRef(s) which returns a reference to the building schedule by calling the ScheduleModel's 42 getSched(s) process. The ScheduleSyncService 12 then compares the external schedule and the building schedule and merges any differences. If there are differences, the ScheduleSyncService 12 would update both the building schedule and the external schedule by calling the ScheduleModel's 42 writeSchedule(syncSched) and the GDataCalendarDataAccess's 44 writeCalendar(syncSched) processes, which calls the GoogleCalendarService's 11 update( )API.

There may be the schedule mapping having a many-to-1 scenario including many building schedules/1 external schedule (calendar). The following pseudo code may outline the logic for carrying out a schedule synchronization process related to the Many-to-1 schedule mapping.

```
Get list of external schedule ( c )
For each schedule ( c )
    Get list of corresponding building schedule ( s )
    For each schedule (s)
        Sync schedule s & c *
```

There may be the schedule mapping having a 1-to-many scenario including 1 building schedule/many external schedules (calendar). The following pseudo code may outline the logic for carrying out a schedule synchronization process related to the 1-to-many schedule mapping.

```
Get list of building schedules ( s )
For each schedule ( s )
    Get list of corresponding external schedule ( c )
    For each schedule ( c )
        Sync schedule s & c *
```

One may note that the sync method for schedules s & c in this case would likely use the optional sync method by merging schedule events from an external source when the sync direction is from an external to building schedule.

Figure 4:
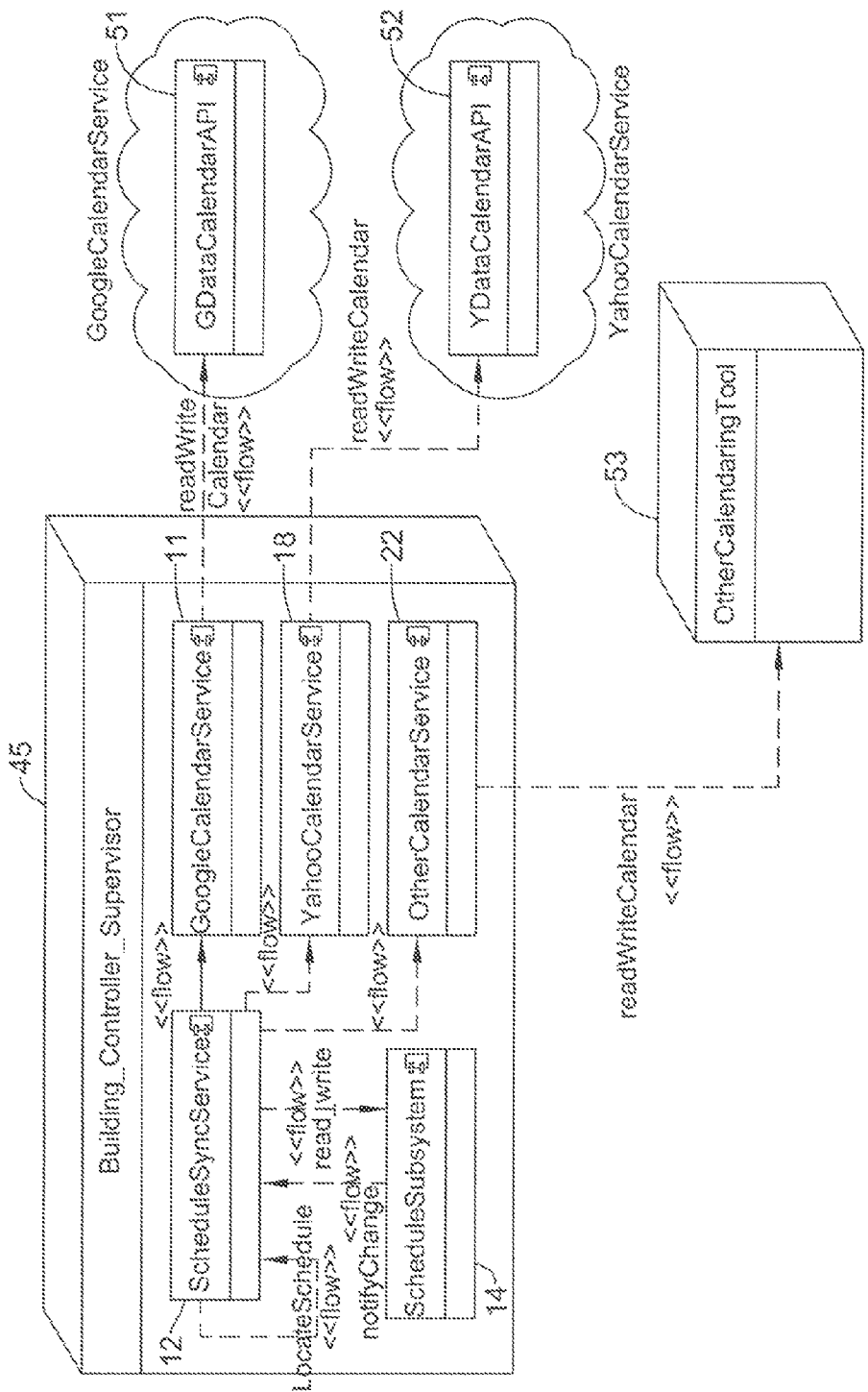
FIG. 4 is a diagram of a physical or deployment view of components which may be in the present system.

FIG. 4 is a diagram showing a physical or deployment view of the components described in the previous logical subsystem view. Connections to various calendaring services may be via the web. There may be a building Controller Supervisor 45 containing the ScheduleSyncService 12. ScheduleSyncService 12 may have a read write flow line to the ScheduleSubsystem 14. ScheduleSubsystem 14 may have a notifyChange flow line to ScheduleSyncService 12. ScheduleSyncService 12 may have a LocateSchedule flow line to itself. There may be a flow line from ScheduleSyncService 12 to GoogleCalendarService 11, a flow line from ScheduleSyncService 12 to YahooCalendarService 18, and a flow line from ScheduleSyncService 12 to OtherCalendarService 22. Just one, or more than one flow line to a calendar service from the ScheduleSyncService 12 may be present at the same time.

GoogleCalendarService 11 may have a readWriteCalendar flow line to a GDataCalendarAPI 51 of the GoogleCalendarService. YahooCalendarService 18 may have a readWriteCalendar flow line to a YDataCalendarAPI 52 of the YahooCalendarService. OtherCalendarService 22 may have a readWriteCalendar flow line to an OtherCalendaringTool 53.

In a summary, there may be a building control system incorporating an external calendar service, having a schedule subsystem (which may in some circumstances be referred to as a building schedule subsystem, or a mechanism for using an external calendar system to schedule operations or activities within a building), a schedule synchronization subsystem connected to the schedule subsystem, and an external calendar configuration subsystem connected to the schedule synchronization subsystem. The schedule subsystem may have a schedule object, a building schedule mechanism for activating different subsystems in a building based on a configuration of a building schedule, and a schedule change mechanism for creating, configuring and/or changing the building schedule.

The schedule synchronization subsystem may have a coordination mechanism for coordinating an overall schedule synchronization process between the schedule subsystem and the external calendar configuration subsystem. The schedule synchronization subsystem may also have a reference mechanism for providing a cross-reference configuration of the building schedule and associated external schedule information.

The external calendar configuration subsystem may have a data mechanism for providing data access for creating, reading, writing and/or deleting at least a portion of a specific configured calendar in the external calendar configuration subsystem.

The external calendar configuration subsystem may have a normalization mechanism for normalizing a data model of an external calendar configuration into a data model of a specific building control schedule.

One or more building schedules may map to one or more external calendars.

The schedule synchronization subsystem may have a synchronization mechanism for providing a synchronization process. The synchronization process can be triggered by one of a set of certain conditions. The set of certain conditions may include a schedule change in the building control subsystem, a change notification from the external calendar configuration subsystem; and/or a periodic updating by the schedule synchronization subsystem.

The schedule subsystem may be for controlling one or more devices from a group containing, but not limited to, building subsystems such as HVAC, lighting, power sources, access control, and security.

In the present specification, some of the matter may be of a hypothetical or prophetic nature although stated in another manner or tense.

Although the invention has been described with respect to at least one illustrative example, many variations and modifications will become apparent to those skilled in the art upon reading the present specification. It is therefore the intention that the appended claims be interpreted as broadly as possible in view of the prior art to include all such variations and modifications.

What is claimed is:

1. A building control system incorporating an external calendar service, comprising:
    a schedule subsystem;
    a schedule synchronization subsystem connected to the schedule subsystem; and
    an external calendar configuration subsystem connected to the schedule synchronization subsystem; and
    wherein:
        the schedule subsystem comprises:
            a building schedule mechanism for activating different subsystems in a building based on a configuration of a building schedule; and
            a schedule change mechanism for creating, configuring and/or changing the building schedule; and
        one or more building schedules map to one or more external calendars.

2. The system of claim 1, wherein:
    the schedule synchronization subsystem comprises a coordination mechanism for coordinating an overall schedule synchronization process between the schedule subsystem and the external calendar configuration subsystem.

3. The system of claim 2, wherein the schedule synchronization subsystem further comprises a reference mechanism for providing a cross-reference configuration of the building schedule and associated external schedule information.

4. The system of claim 2, wherein the external calendar configuration subsystem further comprises a data mechanism for providing data access for creating, reading, writing and/or deleting at least a portion of a specific configured calendar in the external calendar configuration subsystem.

5. The system of claim 2, wherein the schedule synchronization subsystem further comprises a synchronization mechanism for providing a synchronization process.

6. The system of claim 1, wherein the external calendar configuration subsystem comprises a normalization mechanism for normalizing a data model of an external calendar configuration into a data model of a specific building control schedule.

7. A method for incorporating an external calendar service into a building control system, comprising:
    providing a schedule subsystem comprising a schedule object;
    connecting a schedule synchronization subsystem to the schedule subsystem; and
    connecting an external calendar configuration subsystem to the schedule synchronization subsystem; and
    mapping one or more building schedules of the schedule subsystem to one or more external calendars.

8. The method of claim 7, wherein a connection of the external calendar configuration subsystem to the schedule synchronization subsystem enables the schedule object to be viewed and updated by the external calendar configuration subsystem.

9. The method of claim 7, wherein:
    the schedule object is responsible for managing events and activities in the system;

the schedule subsystem further comprises:
- a building schedule mechanism for activating different subsystems in a building based on a configuration of the one or more building schedules; and
- a schedule change mechanism for creating, configuring and/or changing the one or more building schedules; and the schedule synchronization subsystem comprises a coordination mechanism for coordinating an overall schedule synchronization process between the schedule subsystem and the external calendar configuration subsystem.

10. The method of claim 7 wherein the external calendar configuration subsystem comprises a normalization mechanism for normalizing a data model of an external calendar configuration into a data model of a specific building control schedule.

11. The method of claim 7, wherein the schedule synchronization subsystem comprises:
- a synchronization mechanism for providing a synchronization process; and wherein:
the synchronization process can be triggered by one of a set of certain conditions; and
the set of certain conditions comprises:
- a schedule change in a building control schedule;
- a change notification from the external calendar configuration subsystem; and/or
- a periodic updating by the schedule synchronization subsystem.

12. A building control system incorporating an external calendar service, comprising:
- a schedule subsystem comprising a schedule object;
- a schedule synchronization subsystem connected to the schedule subsystem; and
- an external calendar configuration subsystem connected to the schedule synchronization subsystem; and
- wherein the external calendar configuration subsystem comprises a normalization mechanism for normalizing a data model of an external calendar configuration into a data model of a specific building control schedule.

13. The system of claim 12, wherein a connection of the external calendar configuration subsystem to the schedule synchronization subsystem enables the schedule object to be viewed by the external calendar configuration subsystem.

14. The system of claim 12, wherein:
the schedule object is responsible for managing events and activities in the system; and
the schedule subsystem comprises:
- a building schedule mechanism for activating different subsystems in a building based on a configuration of the specific building schedule; and
- a schedule change mechanism for creating, configuring and/or changing the building schedule.

15. The system of claim 14, wherein one or more building schedules map to one or more external calendars.

16. The system of claim 12, wherein the schedule synchronization subsystem comprises a coordination mechanism for coordinating an overall schedule synchronization process between the schedule subsystem and the external calendar configuration subsystem.

17. The system of claim 12, wherein the external calendar configuration subsystem comprises a data mechanism for providing data access for creating, reading, writing and/or deleting at least a portion of a specific configured calendar in the external calendar configuration subsystem.

18. The system of claim 12, wherein the schedule synchronization subsystem comprises:
- a synchronization mechanism for providing a synchronization process; and wherein:
the synchronization process can be triggered by one of a set of certain conditions; and
the set of certain conditions comprises:
- a schedule change in a building control schedule;
- a change notification from the external calendar configuration subsystem; and/or
- a periodic updating by the schedule synchronization subsystem.

19. The system of claim 12, the schedule subsystem is for controlling one or more devices from a group containing, but not limited to, building subsystems such as HVAC, lighting, power sources, access control, and security.

20. The system of claim 12, a connection of the external calendar configuration subsystem to the schedule synchronization subsystem enables the schedule object to be updated by the external calendar configuration subsystem.

* * * * *